July 23, 1946.  H. C. FOSTER  2,404,369
INDEXING MECHANISM
Filed July 14, 1944  3 Sheets-Sheet 2
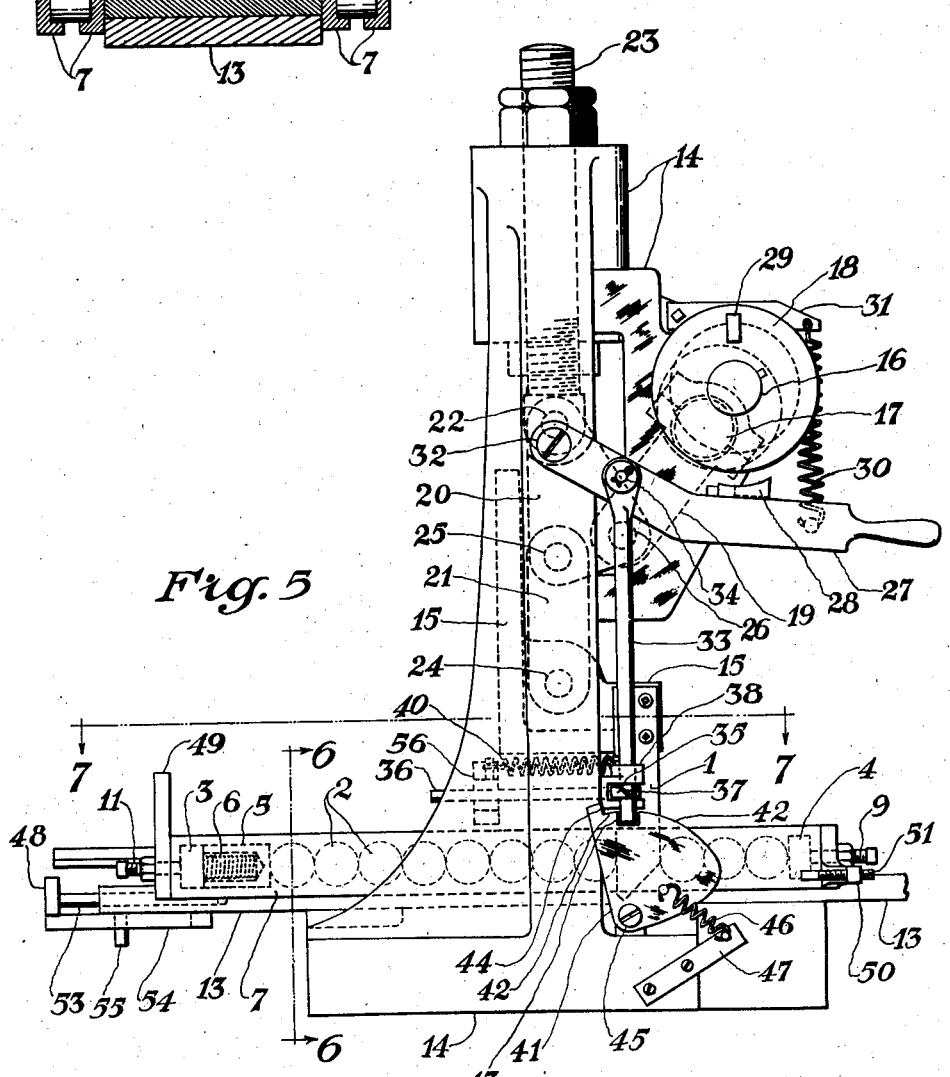
INVENTOR.
Harry Clark Foster
BY
Lionel E. Goff
ATTORNEY

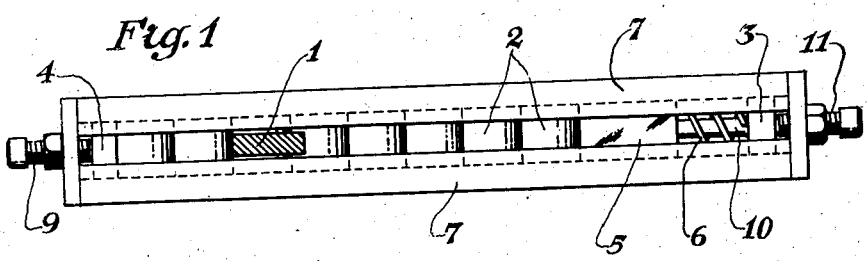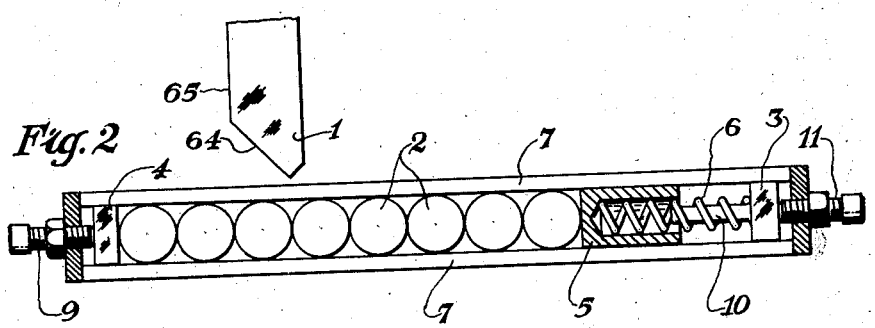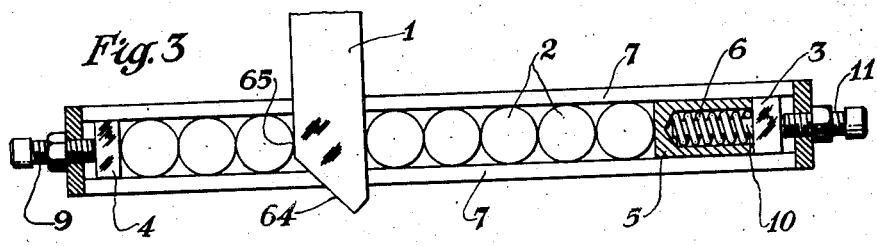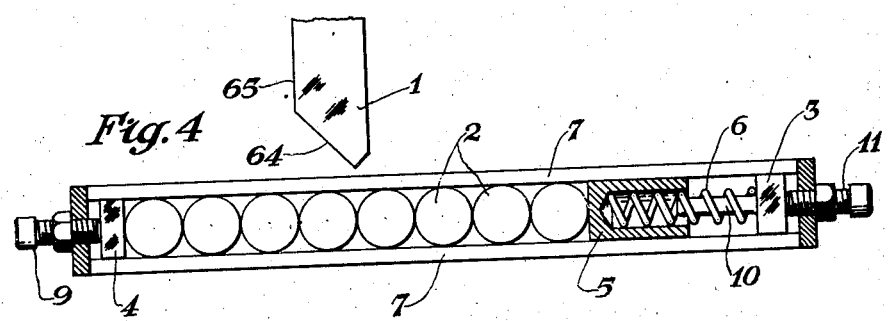

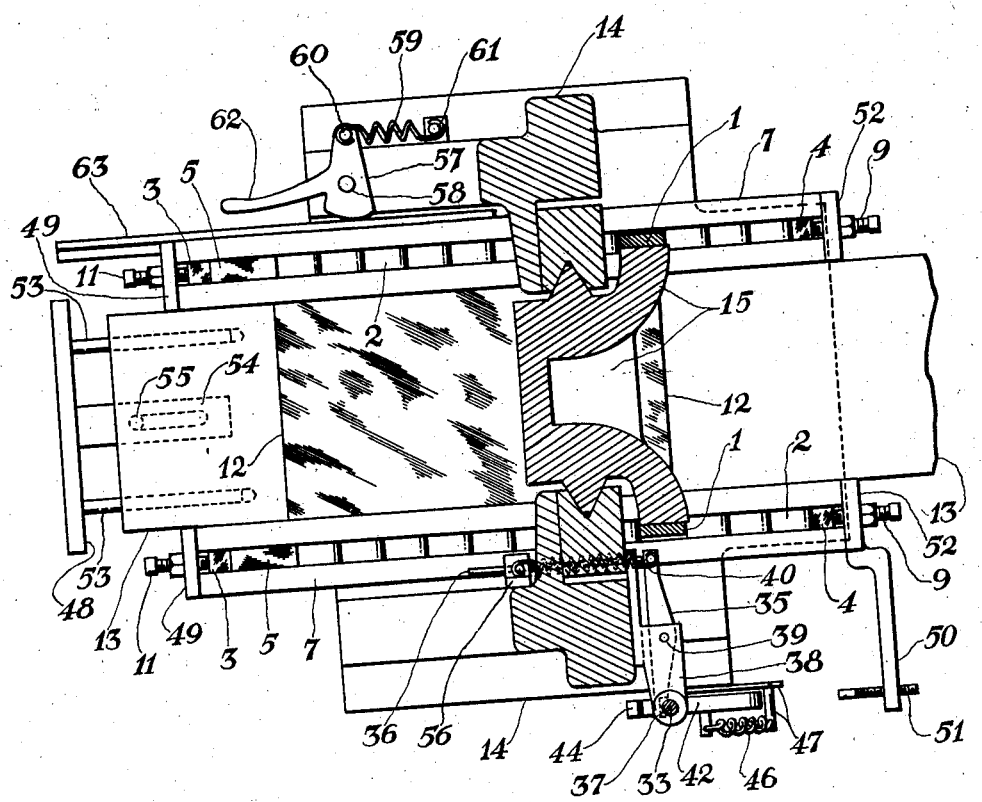

Patented July 23, 1946

2,404,369

UNITED STATES PATENT OFFICE 2,404,369

INDEXING MECHANISM

Harry Clark Foster, Alton, Ill., assignor to Olin Industries, Inc., a corporation of Delaware Application July 14, 1944, Serial No. 544,983

10 Claims. (Cl. 100—70)

1

This invention relates to indexing mechanisms in general and more particularly to an improved work positioning mechanism.

An object of this invention is to provide improved means for moving objects to predetermined positions with a high degree of precision.

Another object of this invention is to provide relatively simple, sturdy and inexpensive work positioning means in such mechanisms as punch presses, drill presses, draw presses, ammunition loading machines, and the like.

Other objects and advantages will become apparent from the descriptions and accompanying drawings, in which, Figure 1 is a plan view and Figures 2, 3 and 4 are side views partly in section, illustrating a cam and series of rollers in accordance with one embodiment of this invention, Figure 5 is a side elevational view of a press illustrating one embodiment of this invention, Figure 6 is a sectional view of a work carrying member and series of rollers taken at section 6—6 of Figure 5 illustrating one embodiment of the invention, and Figure 7 is a detailed plan view of the press partly in section taken at section 7—7 of Figure 5.

In accordance with this invention the above objects are accomplished by the provision of a novel work positioning mechanism having a series of rollers with precise diameters and a cam for insertion between adjacent rollers, which cam effects a change in the relative positions of the series of rollers and the cam. The series of rollers and cam are so mounted that a work carrying member is moved forward an accurately determined distance simultaneously with the change effected in the relative positions of the cam and series of rollers. The cam and rollers may be so mounted that the work carrying member is automatically rigidly held or locked in position during a working operation and likewise so that no working operation can occur until the work and the work carrying member are in the proper operating position, which is of great advantage in precision work.

Referring to the drawings, in Figures 1, 2 and 3, a cam 1 with cam surface 64 and dwell 65 is movably mounted for insertion between adjacent rollers in the series of rollers 2. The series of rollers are positioned for lateral movement only by means such as the channels illustrated at 7. One end of the series of rollers is positively held against the stop or thrust block 4, the other end of the series of rollers being held by the abutting

2 member 5, resilient member or spring 6, and abutment or stop 3. The position of the thrust block 4 in the channels 7 may be adjusted by means of adjustment screw 9. The spring pilot 10 for guiding the spring 6 may be attached to the abutment or stop 3 and the position of the stop 3 in the channel may likewise be adjusted by means of adjustment screw 11.

In Figure 2, the cam 1 is shown ready for insertion between adjacent rollers. In Figure 3 the cam has been inserted between the adjacent rollers, thus forcing the thrust block 4 and channel 7 forward, to the left, the diameter of one roller. Upon insertion of the cam between the rollers, the thrust block 4 is, as stated above, moved forward the diameter of one roller and the space in the channel previously occupied by the resilient member 6 is taken up by the cam 1, so that the abutting member 5 is tightly in contact with the stop 3 and neither the cam nor the series of rollers is free to move either forward or backward, during the time that the parallel surface or dwell 65 of the cam 1 is in contact with the adjacent roller. It is during this dwell while the work is locked in position, that the tools act upon the work. The work carrying member, which is drivingly connected either to the cam or series of rollers may thus be held rigidly in position while a working operation is occurring. In Figure 4, the cam 1 has been removed from between the rollers 2, and the resilient member 6 with abutting member 5 has pushed the next roller up for action by cam surface 64, upon the next insertion of the cam 1.

It will thus be apparent that upon repeated insertions of the cam, the thrust block 4 will be moved forward stepwise the diameter of one or more rollers, depending upon the width, and surface 64, of the cam 1, until the cam is in a position over the abutting member 5, whereupon it is necessary to again start the indexing with the cam above the first roller adjacent the stop 4. It should likewise be understood that the series of rollers 2 may be as long as is necessary or desired for the particular purpose employed, the number of work positions depending upon the number of rollers and number of rollers indexed with each cam insertion.

In Figures 5, 6, and 7 is shown a press, for instance for loading ammunition or the like, illustating one embodiment of applicant's invention. A work carrying member or slide 12 is supported by slide support 13 and has rigidly connected to it on each side channels 7, which channels 7 in turn carry series of rollers 2. The work may be positioned and held on work carrying member or slide 12 by any suitable means. For instance, in loading primers, the work carrying member 12 may hold a removable plate which is drilled to provide cavities for holding the primer cases in rows separated a distance exactly equal to the diameter of the rollers 2. The slide support 13 is mounted on press frame 14.

The ram 15 which carries the working tools, as well as the cams 1, is driven by means of a drive shaft 16 through the action of a connecting rod 19, and crank pin 17. Successive rows of the primers are thus moved directly under the tools upon each insertion of the cams 1 between adjacent rollers 2. The drive shaft 16 is in turn driven by an electric motor, or other suitable power, through the action of clutch plate 18 with clutch key 29. The other end of the connecting rod 19 is drivingly connected to the ram 15 through the toggle links 20 and 21, toggle link 20 turning about pivot 22 and toggle link 21 turning about pivot 24 on the ram 15. The toggle links 20 and 21 are movingly connected at knuckle pin 25. The position of pivot 22 may be adjusted by means of the adjusting member 23. Connecting rod 19 is connected to toggle link 20 by means of wrist pin 26.

Starting lever 27, having clutch cam 28, is movably attached to frame 14 by means of starting lever pivot 32. The starting lever 27 is resiliently held at one end by clutch lever spring 30, which is attached at the other end to spring bracket 31 on frame 14. Clutch cam 28 is designed to engage with clutch key 29 to throw the press out of operation. Latch bar 33 is connected at its upper end to starting lever 27 by means of pin 34. Latch 35, which is operated by release rod 36, is designed to fit in notch 37 in the latch bar 33, while the press is in operation. The latch 35 turns about latch pivot 39 on latch bracket 38 (Figure 7). Latch bracket 38 likewise serves as a guide for latch bar 33. Latch spring 40, connected at one end to latch 35 and at the other to release rod guide 56, tends to maintain latch 35 resiliently in contact with latch bar 33.

Latch control member 41 having surface 42 which serves as a stop for bar 33 and having a recess 43 and stop lug 44, is movably mounted on frame 14 at pivot 45. Spring 46 connected at one end to latch control member 41 and at the other end to spring bracket 47 on frame 14, tends to pull the latch control member 41 clockwise, that is to the right. In operating position latch bar 33 rests in recess 43. When latch control member 41 is so turned that its surface 42 prevents downward movement of latch bar 33, the press will be locked out of operation because clutch cam 28 cannot be withdrawn from engagement with clutch key 29. The slide positioning bar 48 is movably attached to slide support 13 with guide rods 53 in slide support 13, supporting the slide positioning bar 48. The slotted member 54 carried by slide positioning bar 48 engages stop pin 55 on slide support 13 to limit the movement of slide positioning bar 48. Slide positioning bar 48 serves as a stop for work carrying member or slide 12 by contacting the end plates 49 of the channels. Likewise, the slide positioning bar 48, when engaging the end plates 49 of the channels, may be pushed forward to place the work carrying member 12 and channels 7 in starting position, that is, so that the first roll adjacent the thrust block 4 is in proper position under cam 1. Operating arm 50 a part of or attached to channel end plate 52 and carrying set screw 51 when moved to the left, engages latch control member 41 turning it to the left, so that downward movement of latch bar 33 will be prevented by surface 42 and the press will be kept out of operation by the action of clutch cam 28 on clutch key 29.

In the operation of the press, in running position, as illustrated in Figure 5, latch bar 33 rests in recess 43 and latch 35 is held in notch 37 by spring 40. As the ram 15 is moved up and down, cams 1 are likewise moved up and down and, upon each insertion between successive rolls 2, drive or move the work carrying member forward one roll diameter upon each insertion. While the cam 1 is inserted with its parallel faces between the rolls 2, the work carrying member 12 is held rigidly in position and the tools carried by ram 15 operate on the work carried by member 12. When the work carrying member and channels have moved forward to the point where channel end plate 49 engages release rod 36, the latch 35 is pushed out of notch 37, thus unlatching bar 33 which is pulled up by spring 30 so that clutch cam 28 engages clutch key 29 to stop the press. Simultaneously, spring 46 effects a clockwise movement of control member 41, so that stop lug 44 rests against latch bar 33 with surface 42 below bar 33 to prevent the press from restarting, or from being started by manual depression of the lever 27.

Work carrying member 12 may then be pulled backwards manually or otherwise, for instance by means of channel end plates 49, to the limit permitted by slide positioning bar 48. During this operation, set screw 51 effects a counterclockwise movement of control member 41 so that recess 43 is on the opposite side of bar 33 and surface 42 is under bar 33 to prevent the press from being started. In this position, the unloading and loading of work on the carrying member 12 can be readily accomplished.

After the new work has been positioned on member 12, it is then placed in starting position by pushing forward, to the limit permitted by pin 55, the slide position bar 48, which in turn acts on the end plates 49 of the channels to move member 12 and set screw 51 forward, thus permitting spring 46 to rotate control member 41 clockwise until recess 43 is under bar 33.

The press can then be started by depressing the starting lever 27. When the starting lever is depressed, bar 33 is in recess 43 and is retained therein by the locking action of latch 35 on notch 37 during the indexing movements of cams 1, until the latch 35 is pushed out of notch 37 by the action of end plate 49 on release rod 36, which again, as described above, stops the press.

Ordinarily the work carrying member 12 will be held in its successive positions by its own weight and friction between it and the slide support 13. Any other suitable means may be employed however for holding the work carrying member 12 in its successive positions as the cam 1 is withdrawn from successive insertions between the rollers 2. For instance, a one way brake 57 operating on brake track 63 on the channel may be employed. As illustrated, the brake 57 pivots eccentrically about pin 58 and has a spring 59 attached at one end to spring post 60. The other end of spring 59 is attached at spring post 61 on frame 14. The brake is provided with brake release lever 62. Thus, through the action of the brake, the channel 7 and work carrying member 12 are free to move forward but cannot move backwards without the operation of brake release lever 62.

In the above specific example the application of the present invention to a press for loading ammunition or the like is described in detail, but it should be understood that the invention is likewise applicable to other devices and mechanisms in which it is necessary to accurately position objects. Likewise, although in the description the cam and roller assembly are effective for a distance of only one roller diameter on each insertion of the cam, the positioning distances may be made two or more roller diameters merely by appropriately changing the width of the cam 1 and the take-up in the resilient member indicated at 5 and 6 in the drawings. The work positioning distances may also be varied by changing the diameter of the rollers, the larger diameter rollers providing larger distances between work positions and smaller diameter rollers providing smaller distances between the work positions. Likewise, the cam 1, instead of being connected to the ram 15, may be drivingly connected to the work carrying member 12, and the series of rollers 2 may then be carried by the ram 15, so that the cam 1 will move along with the work carrying member 12. It is thus obvious that applicant's invention has a wide field of utility and that many changes in the assembly and a wide variation in the construction thereof can be made without departing from the spirit and scope of applicant's invention.

This invention accordingly provides simple, efficient, and inexpensive means for indexing and positioning objects with a high degree of precision. It is to be understood that the embodiments of the present invention as shown and described are only illustrative, and that the scope of the invention is not to be limited thereby except insofar as is defined in the following claims.

Having thus described the invention, what is claimed and desired to secure by Letters Patent is:

1. A work positioning mechanism comprising a roller element and a cam element, said roller element having a series of laterally contiguous rollers held in a channel at one end of the series by a stop and at the other end of the series by a resilient member, said cam element being adapted for insertion between adjacent rollers to change the relative positions of said elements upon each insertion of said cam element, one of said elements being drivingly connected to a work carrying member, and the other of said elements being connected to a tool supporting member.

2. A work positioning mechanism comprising a cam element and a roller element, said roller element being a series of laterally contiguous rollers held in a channel at one end of the series by a stop and at the other end of the series by a resilient member interposed between the rollers and a stop, said cam element being adapted for insertion between adjacent rollers to change the relative positions of said elements upon each insertion of said cam, one of said elements being drivingly connected to a work carrying member, means for supporting and guiding said work carrying member, the other of said elements being connected to a tool supporting member, said resilient member permitting lateral movement of said rollers between said stops only to the extent occasioned by the insertion of said cam, so that said elements are interlocked during each complete insertion of the cam while the tools are in working position.

3. A work positioning mechanism comprising in combination a series of laterally contiguous rollers, a stop at one end of said series of rollers, a stop separated from the other end of said series of rollers by a resilient member, said stops being rigidly connected to a work carrying member, a frame supporting said work carrying member, and a translation cam adapted for insertion between adjacent rollers operative to drive the said stops and work carrying member forward at least one roll diameter upon each insertion of said cam.

4. A work positioning mechanism comprising in combination a series of laterally contiguous rollers, a forward stop for said rollers rigidly connected to a work carrying member, a rear stop rigidly connected to said work carrying member and separated from the other end of said series of rollers by a resilient member, means supporting said work carrying member, and a cam movably carried by said support means for insertion between adjacent rollers and operative upon each insertion between said rollers to drive said stops and work carrying member forward one roller diameter.

5. A work positioning mechanism comprising in combination a series of laterally contiguous rollers, a stop at one end of said series of rollers, a stop and an abutting member separated from each other by a resilient member at the other end of said series of rollers, said stop being rigidly connected to a work carrying member, a frame supporting said work carrying member, and a translating cam adapted for insertion between adjacent rollers and operative to drive the said stops and work carrying member forward at least one roller diameter upon each insertion of said cam, said abutting member and adjacent stop being separated from each other by full extension of said resilient means a distance equal to the width of said cam, so that said stops and work carrying member are held stationary while said cam remains inserted between said rollers.

6. A work positioning mechanism comprising in combination a series of laterally contiguous rollers, a forward stop for said rollers rigidly connected to the work carrying member, an abutting member at the other end of said series of rollers, means supporting said work carrying member, a cam movably carried by said support means for insertion between adjacent rollers, a rear stop rigidly connected to said work carrying member and separated from said abutting member a distance equal to the width of said cam by a resilient member, said cam being operative upon each insertion between said rollers to drive said stop and work carrying member forward at least one roll diameter and while inserted between said rollers to hold said stop and work carrying member stationary.

7. In a press having a tool carrying member and a work carrying member the combination comprising a roller element having a series of laterally contiguous rollers held in a channel at one end of the series by a stop and at the other end of the series by a resilient member, a cam element adapted for insertion between adjacent rollers to change the relative positions of said elements upon each insertion of said cam element, one of said elements being drivingly connected to said work carrying member, the other of said elements being connected to said tool supporting member, means preventing starting of said press while said work carrying member is out of starting position, and means for automatically stopping the operation of said press when said work carrying member has traveled the distance provided for by said cam and roller members.

8. In a press having a tool carrying member and a work carrying member the combination comprising channels each carrying a series of laterally contiguous rollers and rigidly attached on each side of said work carrying member, abutting members in said channels at one end of said series of rollers separated from the end of said channel by resilient members, cams carried by said work carrying member adapted for insertion between adjacent rollers in each of said channels, said cam being adapted to drive said channels and work carrying member forward at least one roller diameter upon each insertion, said abutting members being separated from the ends of said channels by said resilient members a distance equal to the width of said cam, so that said work carrying member is held stationary while said cams remain inserted between said rollers, means for operating said tool carrying member and said cams, means for preventing operation of said tool carrying member and cams when said work carrying member and channels are out of operating position, means for holding said channels and work carrying members stationary while said cams are being withdrawn from between said rollers, and means for stopping operation of said tool carrying member and cams when said work carrying member has traveled the complete working distance through said press.

9. A work positioning mechanism comprising roller means and cam means, one of said means being drivingly connected to a work carrying member and the other of said means being connected to a tool supporting member, said cam means being adapted for insertion between successive rollers in said roller means to drive said work carrying member forward to successive predetermined positions, and means for holding said work carrying member stationary while said cam means is withdrawn from between successive rollers in said roller means.

10. A work positioning mechanism comprising a series of rollers and a cam adapted for insertion between adjacent rollers in said series of rollers, said series of rollers being carried in a channel, said channel being attached to a work carrying member, said cam being adapted upon each insertion between said rollers to drive said work carrying member forward at least one roller diameter, means for holding said work carrying member stationary while said cam is between said rollers, and means for holding said work carrying member stationary while said cam is being withdrawn from between said rollers.

HARRY CLARK FOSTER.